Oct. 26, 1926.                                                    1,604,727
                              C. VOLKE
                     SUPPORT FOR TOURISTS' COOKERS
                       Filed Dec. 22, 1925

Patented Oct. 26, 1926.

1,604,727

UNITED STATES PATENT OFFICE.

CARL VOLKE, OF CASSEL, GERMANY.

SUPPORT FOR TOURISTS' COOKERS.

Application filed December 22, 1925, Serial No. 77,003, and in Germany October 23, 1925.

This invention relates to a support for tourists' cookers which is constructed so that hard alcohol, for instance alcohol tablets, or spirit may be used as fuel for heating the contents of the pot. The commonly used tourists' cookers comprises two funnels to be inserted the one into the other, the upper funnel being designed to hold the pot or pan. An apparatus of this kind is not stable and not reliable in use as it does not securely stand on the ground if the ground is not quite plane, and as it is easily shifted if the pot or pan is removed or if the contents of the pot or pan are being stirred. When the support is shifted it frequently happens that the flame of the burner does no longer strike against the centre of the bottom of the pot or pan, whereby a more or less considerable amount of heating power is lost. The apparatus improved according to the invention obviates these inconveniences.

An embodiment of the invention is shown, by way of example, in the accompanying drawing in which:—

Figure 1:
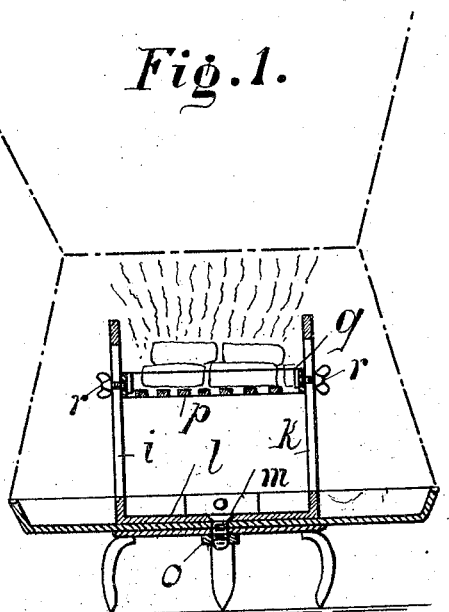
Fig. 1 shows in vertical section a tourist's cooker in which alcohol tablets are burnt.
Figure 2:
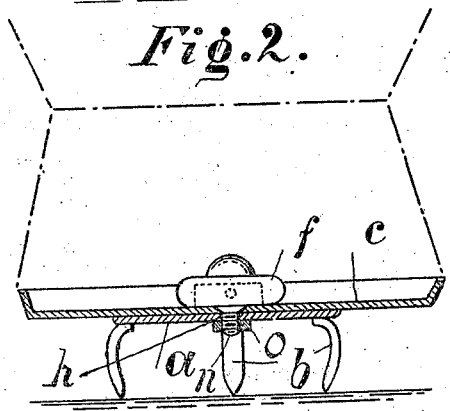
Fig. 2 is a similar section as Fig. 1, showing the apparatus with a burner for liquid spirit.
Figure 3:
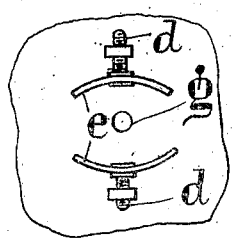
Fig. 3 shows in plan view the adjustable holder for the burner.

The apparatus consists of a sheet iron plate *a* standing on four feet *b* pointed at the lower end. On this plate *a* a plate *c* of larger size is placed which carries an adjustable holder *e* with adjusting screws *d* designed to securely hold a spirit lamp *f*. If the support has to be used for burning alcohol tablets the plate *c* is placed on the plate *a* so that the holes *g*, *h* at the centre of said plates register the one with the other, whereupon a frame composed of two uprights *i*, *k*, having vertical slots and connected at the lower end by a traverse *l* are placed upon the plate *c* so that a hole *m* in the traverse *l* registers with the holes *g*, *h* of the plates *a*, *c*. A connecting screw *n* is inserted through the three holes and secured in position by a nut *o* screwed onto the lower end of said connecting screw. A shallow trough *u* with a grate *p* serves to hold the alcohol tablets. The shallow trough *u* is adjusted by means of thumb screws *r* in the vertical slots of the uprights *i*, *k* so that the distance of the grate *p* from the bottom of the pot or pan can be regulated, in order that the heating power of the flame be utilized in the most favorable manner.

If instead of alcohol tablets liquid spirit is to be used as fuel the frame *i*, *l*, *k* is removed and the spirit lamp *f* is inserted into the holder *e* and secured in position by means of the clamping screws *d*. The flame from the burner will thus strike constantly on the centre of the pot or pan so that no heating power is lost. By unscrewing the connecting screw *n* the support can easily be taken to pieces to be stored in the pot or pan. Owing to the strong and pointed feet *p* which can be stuck into the ground, and owing to the plate *c* on which the lower funnel of the cooker is mounted the apparatus is very stable, and shifting of the spirit lamp is excluded. A further advantage of this invention is that it may be used either for alcohol tablets or for liquid spirit.

I claim:

1. A support for tourists' cookers comprising in combination a sheet iron plate having a central hole, four feet under said plate and having pointed lower ends, a larger sheet iron plate having a central hole to be placed on said plate with feet and designed to carry the pot or pan, arc shaped holders on said large plate, clamping screws in said holders for securely holding a spirit lamp, a connecting screw inserted through the registering holes of said two sheet iron plates, and a nut screwed onto the lower end of said connecting screw for holding the elements together.

2. A support for tourists' cookers comprising in combination a sheet iron plate having a central hole, four feet under said plate and having pointed lower ends, a larger sheet iron plate having a central hole to be placed on said plate with feet and designed to carry the pot or pan, arc shaped holders on said large plate, clamping screws in said holders for securely holding a spirit lamp, a frame consisting of two uprights having vertical slots and of a traverse connecting the lower ends of said uprights said traverse having a central hole, a shallow trough, thumb screws for fixing said trough in the vertical slots of said uprights after it has been adjusted in vertical direction, a grate in said shallow trough designed to hold tablets of solid alcohol, a connecting screw inserted through the registering holes of said two sheet iron plates, and of said traverse of said frame and a nut screwed onto the lower end of said connecting screw for holding the elements together.

In testimony whereof I affix my signature.

CARL VOLKE.